United States Patent [19]
Tajima et al.
[11] 3,866,151
[45] Feb. 11, 1975

[54] SPECIFIC FREQUENCY SIGNAL DETECTING CIRCUIT

[75] Inventors: Mutsunari Tajima; Isao Komatsu, both of Tokyo, Japan

[73] Assignee: Nippon Electric Company, Limited, Tokyo, Japan

[22] Filed: Mar. 13, 1973

[21] Appl. No.: 340,794

[30] Foreign Application Priority Data
Mar. 14, 1972 Japan .............................. 47-026432

[52] U.S. Cl. .................... 333/17, 328/147, 328/149, 333/70 R

[51] Int. Cl. ............................ H04b 3/04, H03h 7/14

[58] Field of Search ................................ 333/15-18, 333/70 R; 328/26, 139, 149; 329/146, 147, 148; 325/65

[56] References Cited

UNITED STATES PATENTS 3,076,939 2/1963 Wycoff ........................... 328/139 X
3,163,717 12/1964 Loughlin ......................... 329/146 X

*Primary Examiner*—James W. Lawrence
*Assistant Examiner*—Marvin Nussbaum
*Attorney, Agent, or Firm*—Sughrue, Rothwell, Mion, Zinn & Macpeak

[57] ABSTRACT

An improved specific frequency signal detecting circuit useful, for example, in a telephone channel includes a bandpass circuit and a band-rejection circuit, the difference in the detected outputs of which is compared with a threshold reference voltage. Detection of the specific frequency signal occurs when the difference voltage exceeds the reference voltage. The bandpass circuit includes an amplitude limiter to prevent malfunctioning or false detecting when formant components are present in the specific frequency signal band.

3 Claims, 2 Drawing Figures

SPECIFIC FREQUENCY SIGNAL DETECTING CIRCUIT

BACKGROUND OF THE INVENTION

1. Field of the Invention

The present invention relates to a specific frequency detecting circuit capable of selectively detecting a specific frequency signal present in a transmission frequency band.

2. Description of the Prior Art

In carrier transmission systems, it has been the practice to transmit a specific frequency signal included in the transmission frequency band. Those so-called inband signals are used for signalling between exchange equipment and for controlling special equipment in the link such as tone disablers for echo suppressors in a data transmission system. A specific frequency detecting circuit used in such transmission systems is required to detect the specific frequency signal to be detected without causing any malfunction or false detection due to signals which are distributed over the transmission band which contain the specific frequency components. However, the conventional detecting circuit has frequently generated an erroneously detected output signal when one of the components of the input signal is present in the specific frequency band corresponding to the specific frequency signal, as is often the case with the formant of a speech signal.

SUMMARY OF THE INVENTION

In view of the foregoing, an object of this invention is to provide a specific frequency signal detecting circuit having a high detection sensitivity, and being free from any malfunction or false detection even when a high level input signal is supplied. This is accomplished by providing within a detecting circuit having a bandpass circuit passing all frequency components and a band-rejection circuit attenuating the specific frequency band, the difference in the detected outputs of which is compared with a threshold reference voltage, an amplitude limiter in the bandpass circuit to prevent malfunctioning or false detection when formant components are present in the specific frequency signal band.

BRIEF DESCRIPTION OF THE DRAWING

The present invention will be described in detail referring to the appended drawings, wherein:

Referring to FIG. 1 it is first assumed that the detecting circuit is receiving only the specific frequency signal to be detected (such signal will hereinafter be referred to as "specific frequency signal"). In FIG. 1, the specific frequency signal applied to an input terminal 101 is branched to two circuits; a bandpass circuit 110 of infinite bandwidth which is arranged so as to pass all the frequency components in the transmission band, and a band-rejection circuit 111 which attenuates only the specific frequency signal while allowing all the frequency components other than the specific frequency components. The specific frequency signal applied to the circuit 110 is amplified by an amplifier 102 and then rectified by a detector 103. While, the specific frequency signal applied to the band-rejection circuit 111 is attenuated by a band-rejection filter 104, amplified by an amplifier 105, and rectified by a detector 106. The resultant d.c. output voltage is subtracted from the output of said circuit 110 by a substractor 107. Only when this d.c. output voltage is larger than a reference voltage of a comparator 108, this comparator generates a detection signal at an output terminal 109. If the attenuation ratio of the band-rejection filter 104 is large enough, the output voltage of the substractor 107 is nearly directly dependent upon the output voltage from the detector 103. Hence the output voltage of the substractor 107 can be large enough by making the gain of the amplifier 102 large enough, so that it can exceed the reference voltage of the comparator 108.

Figure 1:
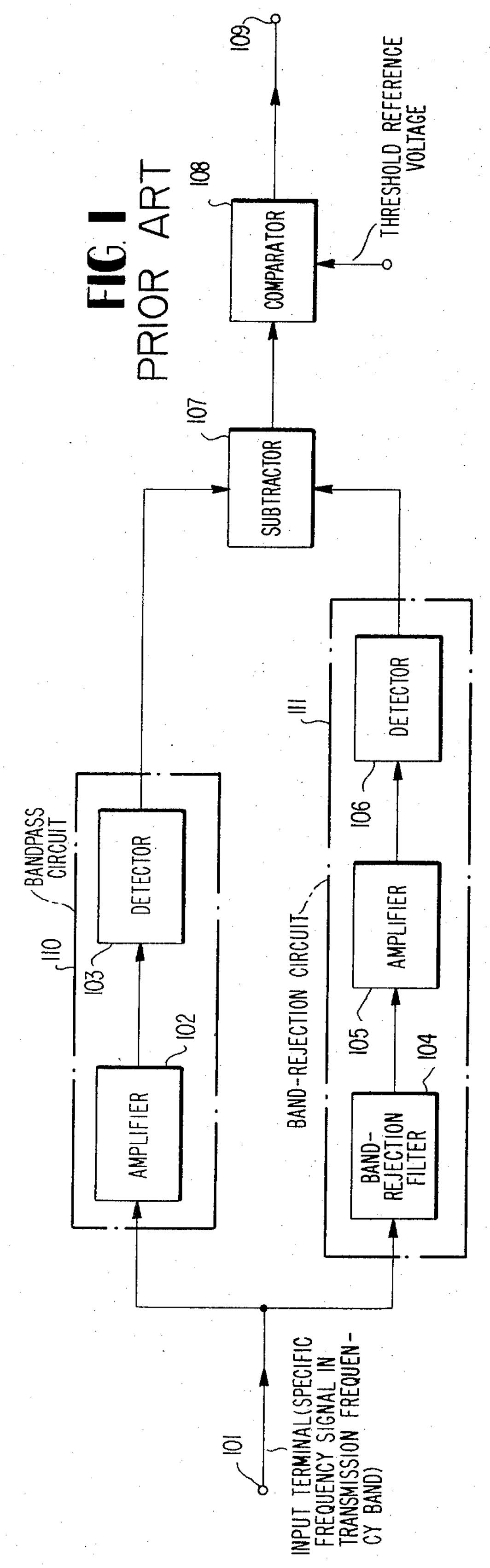
FIG. 1 PRIOR ART
FIG. 1 is a block diagram showing a conventional specific frequency signal detecting circuit.

Secondary, it is assumed that the detecting circuit is receiving a full-range signal containing all frequency components including the specific frequency components. Then, the difference between the outputs of the circuit 110 and the band-rejection circuit 111, or the output of the substractor 107, becomes smaller than that in the operation where only the specific frequency signal is received. The extent of decrease in the output depends on the ratio of the level of the specific frequency signal to that of the full-range frequency components. The decision threshold level of the comparator 108 is determined, as detailed below, in relation to the frequency and level of the specific frequency signal, the rejection range of the band-rejection filter 104, the transmission bandwidth and so forth. Assuming that the gains of the amplifier 102 and the amplifier 105 are unity and $\alpha$, respectively, that the effective value of the specific frequency components applied to the input terminal 101 (i.e., the effective value of the component belonging to the rejection bandwidth of the band-rejection filter 104) is $E_S$, and that the effective value of the remaining frequency components is $E_G$, then the output of the full-range band-pass circuit 110 is given by $\sqrt{E_S^2 + E_G^2}$, while the output of the band-rejection circuit 111 is given by $\alpha E_G$. The condition on which the specific frequency signal detecting circuit generates an output thereof is given as $$\sqrt{E_S^2 + E_G^2} - \alpha E_G > E_T \qquad 1$$

where $E_T$ is the detecting threshold level of the comparator 108 (where the losses in the substractor are neglected).

The condition (1) becomes $E_S > E_T$ when $E_G = 0$, or when only the specific frequency signal is received. In general, the detecting circuit should be as sensitive as possible, or, in other words, the minimum input level at which the detecting circuit can operate should be as low as possible, such as −30 dB. This means that the threshold level $E_T$ should be low enough corresponding to the detection terminal, as in the case of a telephone channel having sufficiently higher levels than that corresponding to the detection sensitivity is applied to the input sensitivity. On the other hand, when the full-range signal, the signal detecting circuit should not operate. More particularly, in the telephone channel, $E_G$ corresponds to the levels of the majority of the speech signal frequency components, and $E_S$ to the levels of the components which are, among the speech signal frequency components, present in the specific frequency band. Generally, the ratio $E_S/E_G$ remains small. This ratio, however, can become large when the formant components are present in the specific frequency band. This will cause the output of the subtractor 107 to exceed $E_T$, causing malfunction or false detection (See "The Echo Suppressor No. 7A" by A. G. Hodsoll, Post Office Electrical Engineer's Journal, Vol. 63, No. 2, 1970, pp 86–91, published in England.).

Figure 2:
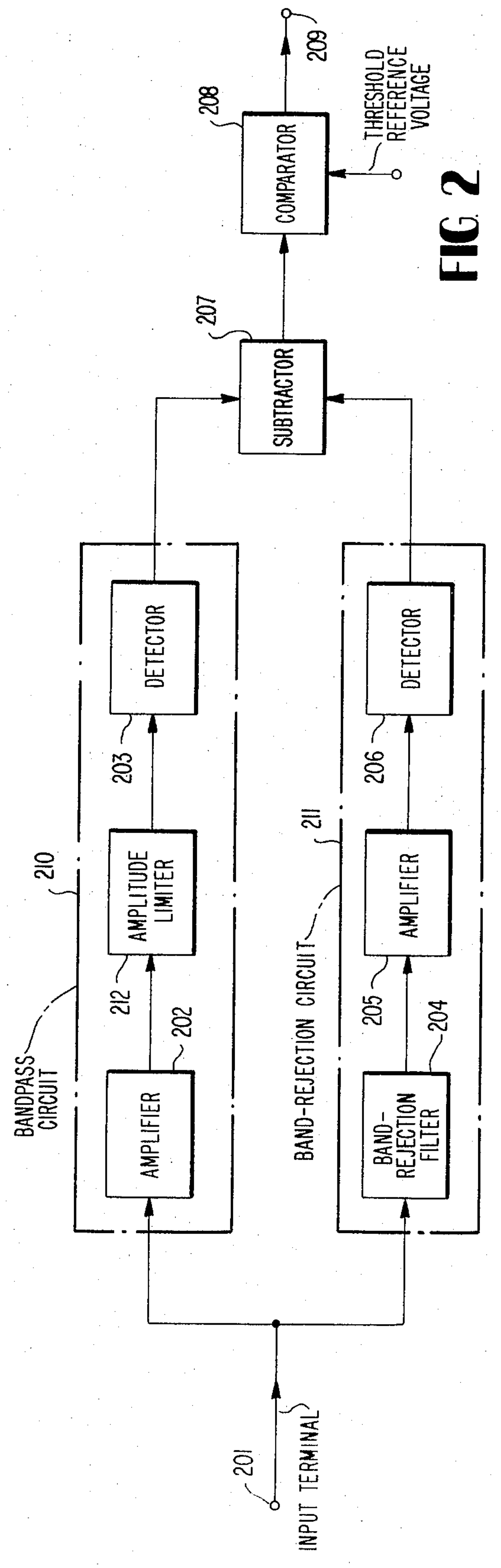
FIG. 2 is a block diagram showing a specific frequency signal detecting circuit of this invention.

Now referring to FIG. 2, which shows a block diagram of a a specific frequency signal detecting citcuit according to this invention, the numeral 201 donotes an input terminal; 210, a full-range bandpass circuit; 211, a band-rejection circuit; 202, an amplifier; 203, a detector consisting of rectifying and ripple smoothing circuits; 204, a band-rejection filter which can be realized by the so-called inverse circuit of a conventional band-pass filter; 205, an amplifier; 206, a detector; 207, a subtraction circuit which provides the voltage difference between the outputs of detectors 203 and 206, utilizing, for example, a conventional operational amplifier; 208, a comparator, which judges whether the input voltage exceeds the predetermined threshold voltage by comparing the input with the threshold level, consisting of, for example, a direct-coupled differential amplifier with two inputs and a reference voltage source connected to one of the inputs of the differential amplifier; 209, an output terminal; and 212, an amplitude limiter added according to the invention.

The amplitude limiter 212 utilizes the nonlinear part of a forward voltage-current characteristic of, for example, a diode and is designed so that it starts amplitude limiting at a level higher than that corresponding to the detection sensitivity.

This detecting circuit operates in the same manner as in the circuit of FIG. 1 when a specific frequency signal is applied. While, when the full-range signal is applied to the circuit, the output of the subtractor 207 does not exceed the detection threshold $E_T$ because the value $\sqrt{E_S^2 + E_G^2} - \alpha E_G$ is small in the range of low signal level. However, when the signal level becomes high beyond the amplitude limit starting level, the output of the subtractor 207 becomes equal to $\beta \sqrt{E_S^2 + E_G^2} - \alpha E_G$ (where $\beta$ is a nonlinear multiplier smaller than 1 and becomes smaller with increase in he signal level) and remains lower than $E_T$ whereby the circuit is prevented from malfunctioning.

The gain $\alpha$ of the amplifier 205 is chosen slightly higher than that of the amplifier 202 (which is unity in the embodiment), so that the detecting circuit may not be unduly disabled by the circuit noise with the level near the minimum sensitive level.

Instead of utilizing the forward nonlinear characteristic of a diode for the amplitude limiter, it is possible to use the breakdown characteristic of a zener diode, the saturation characteristic of a transistor, or the like. Also, instead of these "instantaneous type limiters," the "dynamic type limiters" such as automatic volume or gain control circuits may be used.

In the above embodiment, the band-rejection filter has been described as one which passes all frequency components in the transmission band, excluding the specific frequency components. However, this ideal condition is not always necessary. Namely, the band-rejection filter may have another deteriorated characteristic wherein some particular frequency components among the all frequency components, together with the specific frequency components do not pass therethrough.

The guard sensitivity is in turn defined as the minimum input level of the specific frequency signal at which the specific frequency signal is detected in the presence of all frequency components in the transmission band.

We claim:

1. In a specific frequency signal detecting circuit comprising:

means for passing full-range frequency components in a transmission frequency band and for delivering a first d.c. signal representative of the level of said full-range frequency components;

means for attenuating specific frequency components in said frequency band, for passing the remaining frequency components in said frequency band, and delivering a second d.c. signal representative of the level of said remaining frequency components;

means for subtracting said second d.c. signal from said first d.c. signal; and means for generating a detection signal when the output of said subtracting means exceeds a given threshhold value, thereby to detect a specific frequency signal contained in said specific frequency components;

the improvement comprising an amplitude limiting means in said full-range frequency components passing means for restricting the output level of said full-range frequency components passing means to a value below a predetermined level.

2. A specific frequency signal detecting circuit comprising:

means for passing full-range frequency components in a transmission frequency band and for delivering a first d.c. signal representative of the level of said full-range frequency components, including amplitude limiting means for causing the gain of said full-range frequency components passing means to be a non-linear multiplier decreasing with increasing signal level;

means for attenuating specific frequency components in said frequency band, for passing the remaining frequency components in said frequency band, and delivering a second d.c. signal representative of the level of said remaining frequency components;

means for subtracting said second d.c. signal from said first d.c. signal; and means for generating a detection signal when the output of said subtracting means exceeds a given threshold value, thereby to detect a specific frequency signal contained in said specific frequency components whereby the detecting circuit is prevented from malfunctioning by externally introduced circuit noise whose level is near said given threshhold value when measured at the input of said detection signal generating means.

3. A specific frequency signal detecting circuit comprising:

means for passing full-range frequency components in a transmission frequency band and for delivering a first d.c. signal representative of the level of said full-range frequency components, said full-range frequency components passing means including an amplifier receiving an input signal, amplitude limiting means having a non-linear gain decreasing with increasing signal level, and a detector, said amplifier, amplitude limiting means and said detector being connected in series;

means for attenuating specific frequency components in said frequency band, for passing the remaining frequency components in said frequency band, and delivering a second d.c. signal representative of the level of said remaining frequency components, said specific frequency attenuating means including a band-rejection filter for rejecting said specific frequency components, an amplifier, and a detector, said band-rejection filter, amplifier and detector being connected in series;

means for subtracting said second d.c. signal from said first d.c. signal; and means for generating a detection signal when the output of said subtracting means exceeds a given threshold value, thereby to detect a specific frequency signal contained in said specific frequency components without malfunctioning when externally introduced circuit noise measured at the input of said detection signal generating means is at a level near said given threshold value.

* * * * *

UNITED STATES PATENT OFFICE
CERTIFICATE OF CORRECTION

PATENT NO. : 3,866,151

DATED : February 11, 1975

INVENTOR(S) : Mutsunari TAJIMA et al

It is certified that error appears in the above-identified patent and that said Letters Patent are hereby corrected as shown below:

IN THE SPECIFICATION:

Column 2, line 4 - delete "substractor" and insert -- subtractor -- line 9 - delete "substractor" and insert -- subtractor -- lines 11-12 - delete "substractor" and insert -- subtractor -- line 15 - delete "Secondary" and insert -- Secondly -- line 20 - delete "substractor" and insert -- subtractor -- lines 54-61 - delete "This means that the threshold level $E_T$ should be low enough corresponding to the detection terminal, as in the case of a telephone channel having sufficiently higher levels than that corresponding to the detection sensitivity is applied to the input sensitivity. On the other hand, when the full-range signal, the signal detecting circuit should not operate."

and insert

--This means that the threshold level $E_T$ should be low enough corresponding to the detection sensitivity. On the other hand, when the full-range signal having sufficiently higher levels than that corresponding to the detection sensi-tivity is applied to the input terminal, as in the case of a telephone channel, the signal detecting circuit should not operate.--

UNITED STATES PATENT OFFICE

CERTIFICATE OF CORRECTION

PATENT NO. : 3,866,151

DATED : February 11, 1975

INVENTOR(S) : Mutsunari TAJIMA et al

It is certified that error appears in the above-identified patent and that said Letters Patent are hereby corrected as shown below:

line 8 - delete "a" (first occurrence)

line 8 - delete "citcuit" and insert -- circuit -- line 9 - delete "donotes" and insert -- denotes -- line 43 - delete "he" and insert -- the --

IN THE CLAIMS:

Column 4, line 23 - delete "threshhold" and insert -- threshold -- line 57 - delete "threshhold" and insert -- threshold --

Signed and Sealed this

*fourteenth* Day of *October 1975*

[SEAL]

*Attest:*

RUTH C. MASON
*Attesting Officer*

C. MARSHALL DANN
*Commissioner of Patents and Trademarks*